United States Patent [19]

Heckmann

[11] Patent Number: 5,023,055

[45] Date of Patent: Jun. 11, 1991

[54] FLOW TESTER

[75] Inventor: Johannes Heckmann, Lübeck, Fed. Rep. of Germany

[73] Assignee: Drägerwerk Aktiengesellschaft, Lübeck, Fed. Rep. of Germany

[21] Appl. No.: 261,164

[22] Filed: Oct. 21, 1988

[30] Foreign Application Priority Data

Oct. 22, 1987 [DE] Fed. Rep. of Germany ....... 3735676

[51] Int. Cl.⁵ .............................................. G01N 31/00
[52] U.S. Cl. ........................................ 422/83; 422/58; 422/103; 436/902; 73/188; 252/305
[58] Field of Search ..................... 422/55, 58, 83, 86, 422/93, 103; 252/305; 436/902; 73/188; 340/603, 608

[56] References Cited

U.S. PATENT DOCUMENTS

| 3,022,141 | 2/1962 | Grosskopf | 422/86 X |
| 3,033,655 | 5/1962 | Grosskopf | 422/86 |
| 3,100,692 | 8/1963 | Wächter | 422/86 |
| 3,658,719 | 4/1972 | McConnaughey | 73/188 X |
| 4,800,067 | 1/1989 | Heckmann et al. | 422/86 |

Primary Examiner—Robert J. Warden
Assistant Examiner—Rebekah A. Griffith
Attorney, Agent, or Firm—Walter Ottesen

[57] ABSTRACT

The invention is directed to a flow tester for air wherein at least two different materials are accommodated in at least two supply chambers. A visible aerosol is formed when the materials are mixed. The flow tester is improved with respect to an optimal adjustment of the mixing ratio of the components as well as providing a reduction of the flow resistance. The flow tester includes at least two supply chambers which are connected in parallel with respect to the flow therethrough.

17 Claims, 2 Drawing Sheets

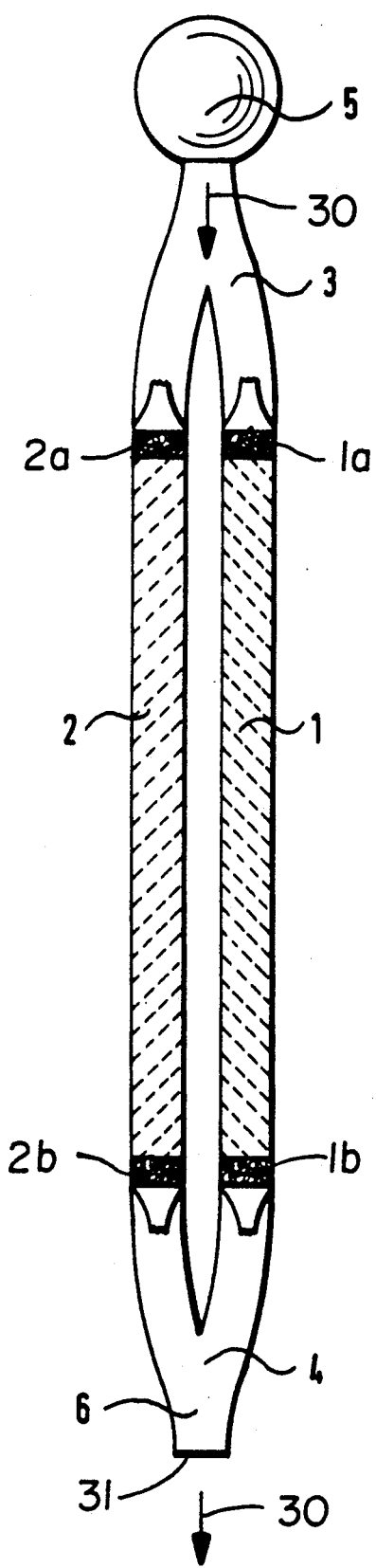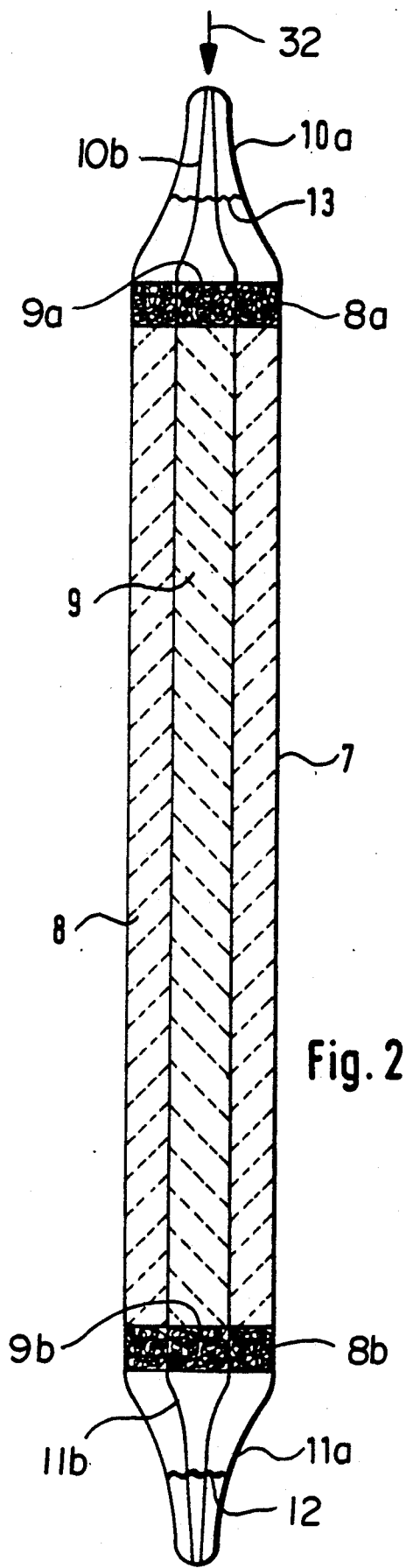
Fig. 1
Fig. 2

FLOW TESTER

FIELD OF THE INVENTION

The invention relates to a flow tester for air wherein different materials are accommodated in at least two supply chambers through which an air flow passes. A visible aerosol is formed when the two materials mix.

BACKGROUND OF THE INVENTION

Flow testers for air are used in the mining industry to detect the flow of mine air and serve to detect weak air currents in rooms or industrial facilities. Such flow testers can, for example, be utilized for detecting the course of flow in ventilating and air conditioning installations, in laboratory exhausts and in drying equipment. These flow detectors can also be used in the mining industry for checking air in a mine at obscured regions or after flow obstructions have settled. Still another use of the flow testers is to detect leaks in pipelines and closures such as in furnaces.

Such flow testers are also advantageous when the distribution of vaporous toxic substances is to be estimated in working rooms. In this way, the measuring locations relevant for the air analysis can be selected.

The known flow tester for air comprises a flow testing tube and a small aspirator bulb mounted on the testing tube. The flow testing tube is first closed at both of its ends and for use, the testing tube is opened at both ends. The flow testing tube contains smoking sulphuric acid on a porous carrier and white aerosols form in the air flow which flows out of the flow testing tube when air passes therethrough. The white aerosols make the course of flow visible. The formation of aerosol is however greatly dependent on the moisture of the air and can substantially disappear when the air is very dry. Furthermore, the acidic characteristics of the aerosol are undesired in many instances.

U.S. Pat. No. 3,658,719 discloses a flow tester which includes a testing conduit made of elastic material which is connected to an aspirator bulb. The flow tester includes two components forming an aerosol which are accommodated in breakable ampules mounted one behind the other in the flow conduit. After the ampules are broken and when an air flow is generated, the one component is introduced into the flow path of the other component and the aerosol resulting from the mixture exits at the outlet of the flow tube. Such a configuration results in a relatively high flow resistance because of the placement of the two supply chambers one behind the other. This does not make possible a separate adaptation of the air quantities to the supply chamber through which a flow takes place.

SUMMARY OF THE INVENTION

It is an object of the invention to provide a flow tester which provides an effective aerosol generation with low flow resistance in the air guide path of the supply chambers. Furthermore, an individual adaptation of the through-flow quantity is provided for obtaining a desired optimal mixture ratio. According to a feature of the flow tester of the invention, the supply chambers are connected in parallel with respect to flow. With this division of flow paths for two or more supply chambers, aerosol forming materials of the most different kind can be brought together in optimal mixing ratios while simultaneously obtaining a reduced flow resistance for the air flow during the flow through the supply chambers.

An especially advantageous arrangement is obtained by configuring the supply chambers as the inner chambers of respective testing tubes which are closeable in an air-tight manner at both ends. The testing tubes are then connected together at their output ends by means of an appropriate Y-shaped hose piece to form a mixing zone and are advantageously also connected together by means of an appropriate Y-shaped hose piece at their input ends to establish a connection with as aspirating bulb.

According to another embodiment of the invention, the storage chamber can be mounted in a tubular housing as cylindrically-shaped charges.

In another advantageous embodiment of the invention, a first storage chamber can be mounted in a tubular housing so as to lie behind an inlet opening. A second storage chamber can be arranged behind the first storage chamber when viewed in flow direction with the second supply chamber communicating with an outlet opening via a mixing channel connected in parallel.

A further advantageous embodiment is obtained in that the second chamber includes at least one permeable mixing channel leading to the outlet opening. In this mixing channel, the component entrained in the air flow flows from the first supply chamber so that the mixing channel forms the mixing zone for generating the aerosol because the second component is directed into the mixing channel in parallel.

According to still another embodiment of the invention, a flow-actuated check valve can be mounted between the outlet of the first supply chamber and the inlet to the second supply chamber. In this way, the component materials are prevented from mixing in advance of the time when it is intended to generate the aerosol.

The cylindrically-shaped housing can be advantageously configured so as to be closeable in an air-tight manner at both ends. For this purpose, closure caps made of plastic or breakable glass closures can be utilized.

The component materials accommodated in the supply chambers are preferably bound to granular and/or gel-like carriers. This permits favorable storage characteristics to be combined with a low resistance to flow in the layer.

The most varied combination of materials ma be utilized as aerosol-forming substances. It appears to be advantageous to utilize highly volatile amines in combination with highly volatile chlorides such as $NH_4(OH)$ and $HCl$ so that an $NH_4(Cl)$-aerosol results. Other advantageous combinations of materials can comprise ammonium compounds and hydrochloric acid or acetic acid.

BRIEF DESCRIPTION OF THE DRAWINGS

The invention will now be described with reference to the drawings wherein:

FIG. 1 is an elevation view, partially in section, of a flow tester made up of two testing tubes;

FIG. 2 is an elevation view, in longitudinal section, of a flow tester having a concentric arrangement of the components for forming the aerosol; and, FIG. 3 is a side elevation view, in longitudinal section, of a flow tester wherein the component packs for forming the aerosol are arranged one behind the other.

DESCRIPTION OF THE PREFERRED EMBODIMENTS OF THE INVENTION

Figure 3:
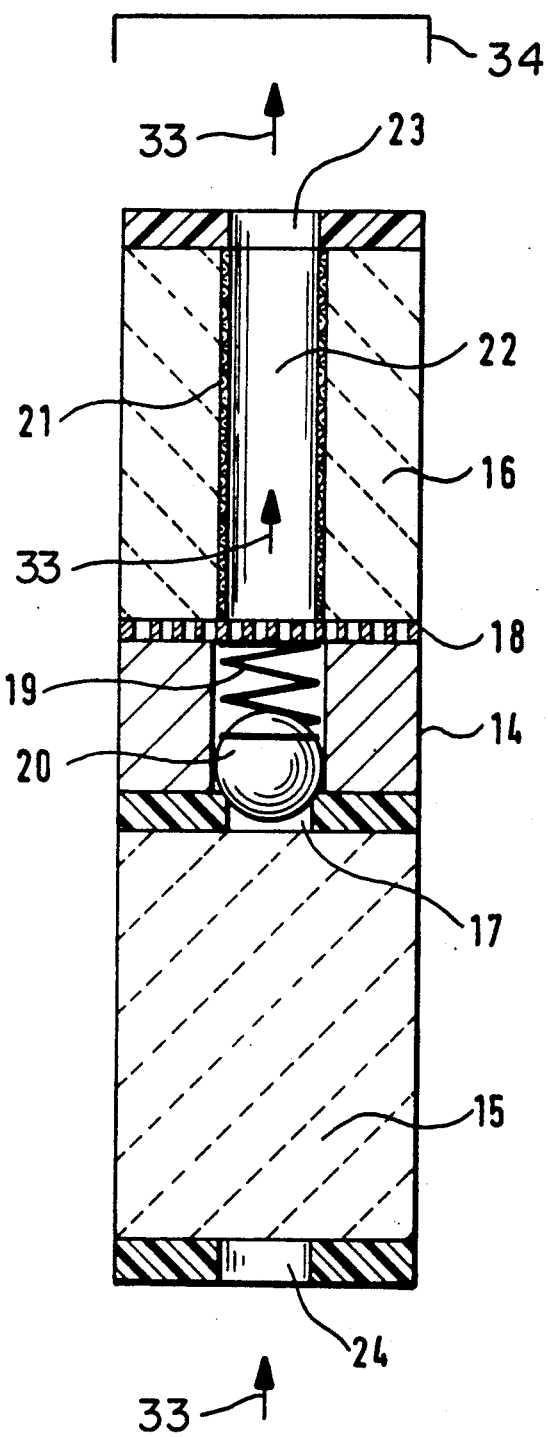

In the embodiment of FIG. 1, two testing tubes (1, 2) are provided as supply chambers and filled with corresponding component materials. The testing tubes (1, 2) are connected in parallel at the input ends as well as the output ends by means of respective Y-shaped connecting pieces (3, 4). The connecting piece 3 at the input end is connected with an aspirating bulb 5 which, if required, can be replaced with an air pumping device such as a portable pump having a magnetic drive. The flow direction is indicated by the arrows 30.

The mixing zone 6 lies in the Y-shaped connecting piece 4 at the output end. In this mixing zone, the aerosols are produced which exit into the ambient via the output opening 31. The testing tubes (3, 4) are each provided with frangible ends which can be broken off prior to use of the flow tester. The component material of testing tube 1 is held between porous retainers (1a, 1b) and the component material of testing tube 2 is held between porous retainers (2a, 2b).

In the embodiment of the flow tester according to FIG. 2, both components are disposed in a tube-shaped housing 7 in which a hollow cylindrically-shaped first supply chamber 8 is provided which contains the first material component. The hollow or annular cylindrically-shaped first supply chamber 8 surrounds a cylindrically-shaped second supply chamber 9 for receiving the second material component. The ends of both supply chambers (8, 9) are configured as drawn-out pointed end portions (10a, 10b), (11a, 11b). The end portion (10a, 10b) is formed as a common melt and can be broken off in common at the break line 13 while the end portion (11a, 11b) can be broken off at the break line 12 when placing the flow tester in use. When the through-flow indicated by arrow 32 takes place, the mixing of the components to form the aerosol takes place at the output end break line 12. The first material component in supply chamber 8 is held in place by annular porous retainers (8a, 8b) and the second material component in supply chamber 9 is held in place by retainers (9a, 9b).

A third embodiment of the invention is shown in FIG. 3 wherein the supply chambers (15, 16) are arranged one behind the other in a tubular housing 14 with the through-flow being indicated by arrows 33. A ball 20 biased by pressure spring 19 is arranged between the outlet 17 of the first supply chamber and a perforated plate 18 of the second supply chamber. The ball 20 operates as a flow-actuated valve.

The hollow cylindrically-shaped second supply chamber 16 lies next to a permeable tubular piece 21 which can, for example, be made of wire netting. The tubular piece 21 extends parallel to a mixing channel 22 which leads to an outlet opening 23. The release of the substance from the second supply chamber 16 occurs primarily by means of diffusion because of the vapor pressure of the enclosed material. An inlet opening 24 of the first supply chamber 15 is connected to an appropriate air pumping device when placed into use. The ball 20 opens against the action of the pressure spring 19 because of the flow pressure so that the component flowing from the first supply chamber 15 flows into the central mixing channel 22 through the perforated plate 18. The mixing channel functions as the mixing zone with an aerosol being delivered at the output opening 23.

It is advantageous to provide removable plastic caps for closing off the outlet opening 23 and the inlet opening 24 in advance of use of the flow tester. The cap 34 for closing off the outlet opening 23 is shown removed from the housing 14 in FIG. 3.

It is understood that the foregoing description is that of the preferred embodiments of the invention and that various changes and modifications may be made thereto without departing from the spirit and scope of the invention as defined in the appended claims.

What is claimed is:

1. An air flow tester for making an ambient air current visible, the air flow tester comprising:

first through-flow passage means defining a first through-flow path and having a first chamber disposed in said first through-flow path;

second through-flow passage means defining a second through-flow path and having a second chamber disposed in said second through-flow path; said first and second through-flow passage means each having an input and output end and being connected in parallel with each other;

first and second aerosol-forming substances disposed in respective ones of said chambers;

a mixing enclosure having input means connected to said output ends of said first and second through-flow passage means and having an outlet; and, air supply means connected to said input ends of said passages for permitting air to flow through said first and second through-flow passage means for entraining said substances so that said substances flow out of said output ends and into said mixing enclosure wherein the first and second substances combine to produce the aerosols which pass from said mixing enclosure and into the ambient through said outlet of said enclosure to provide a visible indication of the air current.

2. The air flow tester of claim 1, said first through-flow passage means being a first testing tube defining said first chamber and being closed at the input and output ends thereof; the closed ends of said first testing tube being frangible ends which can be broken off preparatory to use of the air flow tester; and, said second through-flow passage means being a second testing tube defining said second chamber and being closed at the input and output ends thereof; the closed ends of said second testing tube being frangible ends which can be broken off preparatory to use of the air flow tester.

3. The air flow tester of claim 1, said air supply means comprising: aspirating means for generating the air flow through said first and second through-flow passage means; and, a connecting member interconnecting said aspirating means and said first and second through-flow passage means.

4. The air flow tester of claim 3, said air supply means being an aspirating bulb.

5. The air flow tester of claim 1, said mixing enclosure being a Y-shaped interconnecting member with said input means being two legs thereof connected to corresponding ones of the output ends of said first and second flow passage means and said outlet of said Y-shaped interconnecting member being an outlet common to said two legs.

6. The air flow tester of claim 1, further comprising a tubular-shaped housing; and, said first and second through-flow passage means having a cylindrical configuration and being mounted in said housing.

7. The air flow tester of claim 1, comprising first and second carriers disposed in corresponding ones of said chambers for accommodating said aerosol-forming substances.

8. The air flow tester of claim 1, said aerosol-forming substances being a highly-volatile amine and a highly-volatile chloride, respectively.

9. The air flow tester of claim 1, said aerosol-forming substances being an ammonium compound and hydrochloric acid, respectively.

10. The air flow tester of claim 1, said aerosol-forming substances being an ammonium compound and acetic acid, respectively.

11. An air flow tester for making an ambient air current visible, the air flow tester comprising:
    an elongated housing defining a longitudinal axis and having a first longitudinal end and a second longitudinal end having an outlet formed therein;
    air inlet means formed in said first longitudinal end for permitting a flow of air to enter into said housing when said tester is in use;
    a first supply chamber mounted in said housing downstream of said air inlet means to permit the flow of air therethrough;
    a mixing channel disposed in said housing so as to communicate directly with said outlet;
    a second supply chamber mounted in said housing downstream of said first supply chamber and being connected in parallel with said mixing channel so as to communicate with said outlet through said mixing channel; and, first and second aerosol-forming substances disposed in respective ones of said chambers so as to be entrained by the flow of air for combining in said mixing channel to produce an aerosol which passes to the ambient through said outlet formed in said second longitudinal end to provide a visible indication of an air current.

12. The air flow tester of claim 11, said second supply chamber having a permeable wall defining said mixing channel.

13. The air flow tester of claim 11, comprising a flow-actuated blocking valve mounted in said housing between said supply chambers.

14. The air flow tester of claim 11, comprising first and second carriers disposed in corresponding ones of said chambers for accommodating said aerosol-forming substances.

15. The air flow tester of claim 11, said aerosol-forming substances being a highly-volatile amine and a highly-volatile chloride, respectively.

16. The air flow tester of claim 11, said aerosol-forming substances being an ammonium compound and hydrochloric acid, respectively.

17. The air flow tester of claim 11, said aerosol-forming substances being an ammonium compound and acetic acid, respectively.

* * * * *